(12) United States Patent
Sun

(10) Patent No.: US 8,964,181 B2
(45) Date of Patent: Feb. 24, 2015

(54) METHOD AND SYSTEM FOR MONITORING LED DISPLAY USING OPTICAL FIBER AS LIGHT TRANSMISSION MEDIUM

(76) Inventor: Linqiu Sun, Nanjing (CN)

( * ) Notice: Subject to any disclaimer, the term of this patent is extended or adjusted under 35 U.S.C. 154(b) by 303 days.

(21) Appl. No.: 13/532,263

(22) Filed: Jun. 25, 2012

(65) Prior Publication Data

US 2013/0308133 A1 Nov. 21, 2013

(30) Foreign Application Priority Data

May 15, 2012 (CN) .......................... 2012 1 0149305

(51) Int. Cl.
*G01J 3/46* (2006.01)
(52) U.S. Cl.
USPC .......................................................... 356/402
(58) Field of Classification Search
USPC ................................................ 356/402–425
See application file for complete search history.

(56) References Cited

U.S. PATENT DOCUMENTS

2008/0310181 A1\* 12/2008 Gurevich et al. ............. 362/554
2011/0222059 A1\* 9/2011 Behrend et al. ................ 356/317

\* cited by examiner

*Primary Examiner* — Abdullahi Nur
(74) *Attorney, Agent, or Firm* — Tim Tingkang Xia, Esq.; Morris, Manning & Martin, LLP

(57) ABSTRACT

A system for monitoring LED displays on electronic equipments using optical fiber as light transmission medium comprising: (a) a plurality of LED displays on electronic equipments indicating operation status of the electronic equipments, (b) a plurality of optical light concentrator unit, for collecting light emitted by the LED displays using optical fiber as light transmission medium, (c) a plurality of LED Display Monitors for determining the operation status of the LED displays that reflect the operation status of the electronic equipments, (c) an equipment LED display monitoring software installed and executed in a computer system for comparing the operation status of the LED displays with a predetermined operation status stored in the computer system and providing audio, visual, or electronic messaging alerts if any abnormality occurs, and (d) a communication link between the LED Display Monitors and the computer system.

20 Claims, 3 Drawing Sheets

METHOD AND SYSTEM FOR MONITORING LED DISPLAY USING OPTICAL FIBER AS LIGHT TRANSMISSION MEDIUM

CROSS-REFERENCE TO RELATED APPLICATION

This application claims priority of Chinese Patent Application No. 2012 1014 9305.X, filed on May 15, 2012, entitled "An LED Status Inspection System Using Optical Fiber as Light Transmission Medium" by Linqiu Sun, the disclosure of which is incorporated herein by reference in its entirety.

FIELD OF THE INVENTION

The present invention relates generally to information technology field, and more particularly to method and system for monitoring LED display using optical fiber as light transmission medium.

BACKGROUND OF THE INVENTION

Professional electronic equipment provides various status displays such as LED displays to indicate its operation status so that an operator of the electronic equipment can monitor the operation status in real time. Some electronic equipments have the ability to provide electronic operation status monitoring such as transmit its operation status to a monitoring system such as computer system by using binary code and electronic messaging. Other electronic equipments have the ability to provide visual operation status monitoring by using LED displays to indicate its operation status. For example, a green light indicates that the device is working properly, a red light indicates that the equipment is not working properly or in failure state, and a yellow light indicates that the device is in a warning state. Some electronic equipments are capable of providing both electronic and visual operation status monitoring.

For the equipments with electronic operation status monitoring capability, automatic online monitoring is possible. On the other hand, the equipments requiring visual operation status monitoring are unable to monitor online in real time. Currently, there are three methods to monitor the operation status of electronic equipments requiring visual operation status monitoring:

(a) Periodic Visual Inspection: in many professional fields such as electric power industry and communication industry, in power transmission control room, or communication equipment room, critical equipments using LED displays to indicate their operation status have to be visual inspected periodically. Some are visually inspected hourly, or daily. Others are visually inspected weekly or monthly.

(b) Electronic surveillance cameras: video cameras are installed in control room or communication equipment room and their video signals are transmitted to a monitoring computer so an operator can monitor the operation status of the electronic equipments simultaneously in real time.

(c) Direct connection to LED display: electronic wires are tapped into the anode and cathodes of the LED displays to obtain the operation status of the equipments.

For a professional power transmission control room, or a communication equipment room, the number of LED displays to be monitored can be very large. Some has hundreds, thousands. Others have tens of thousands some time. With such a high number, it is very difficult to implement Periodic Visual Inspection method, and many LED displays may be missed after a long shift for the operator. It is also difficult to implement the Electronic Surveillance Camera approach, because the cost will become prohibitive for large number of LED displays to be monitored. The owners of the electronic equipments to be monitored usually will not agree to the "Direct connection to LED display" method, because the direct connection method is invasive and it is possible to cause failures of the electronic equipments.

Therefore, heretofore unaddressed needs exist in the art to address the aforementioned deficiencies and inadequacies.

SUMMARY OF THE INVENTON

In one aspect, the present invention relates to a method for monitoring a plurality of LED displays on a plurality of electronic equipments using optical fiber as light transmission medium. In one embodiment, the method includes following steps: (a) storing a plurality of predetermined operation status in a computer system for each of the plurality of LED displays, (b) providing a plurality of optical light concentrator units for collecting the light emitted by each corresponding LED display, (c) analyzing the light spectrum of the light collected for determining operation status indicated by the plurality of the LED displays by a plurality of LED Display Monitors, (d) comparing the operation status indicated by the plurality of the LED displays with a corresponding predetermined operation status stored in the computer system to determine whether an abnormality exists, and (e) providing alert if the abnormality exists.

In one embodiment, the computer system has: (a) an input end, (b) an output end, and (c) storage for storing a predetermined operation status of the plurality of LED displays. Each of the plurality of optical light concentrator units is adapted for each of the plurality of the LED displays for collecting the light emitted by corresponding LED display. The alerts include: audio alerts, visual alerts and electronic messaging alerts.

In one embodiment, the operation status for each of the plurality of LED displays is indicated by the light color of the LED display, and whether the light of the LED displays is blinking or steady.

In one embodiment, each of the plurality of optical light concentrator units further includes: (a) a light guiding block for collecting the light emitted by an LED display, (b) an optical fiber having an optical input end and an optical output end, and (c) a concave lens for transmitting the light collected to the input end of the optical fiber. The optical fiber includes (a) plastic optical fiber, and (b) quartz optical fiber.

In one embodiment, each of the plurality of LED Display Monitors includes: (a) a plurality of optical inputs optically coupled to the optical output ends of the optical fiber of the plurality of the optical light concentrator units, (b) an electronic output adapted for transmitting the operation status of each of the plurality of the LED displays coupled to the LED Display Monitor to the computer system via a communication link, and (c) a light color identifier. The communication link includes wired communication link, wireless communication link, and optical communication link. The light color identifier has (a) an output end, (b) an input end, and (c) a light spectrum analyzer. The input end of the light color identifier is optically coupled to the output end of the optical fiber, and the output end of the light color identifier is electronically coupled to the input end of the computer system via the communication link. The light spectrum analyzer is adapted for analyzing the light spectrum and determine the color of the light and whether the light is blinking or steady.

In another aspect, the present invention relates to a system for monitoring LED displays on a plurality of electronic equipments to be monitored using optical fiber as light transmission medium. The system includes: (a) a plurality of LED displays on the plurality of electronic equipments to be monitored, (b) a plurality of optical light concentrator unit, (c) a plurality of LED Display Monitors optically coupled to the plurality of optical light concentrator units for determining the operation status of the plurality of LED displays, (d) an equipment LED display monitoring software installed and executed in a computer system, and (e) a communication link between the LED Display Monitors and the computer system.

In one embodiment, the plurality of the LED displays emit light indicating operation status of the plurality of electronic equipments to be monitored. Each of the optical light concentrator unit collects the light emitted by each of the plurality of LED displays. The computer system has (a) an input end, (b) an output end, and (c) a storage for storing a plurality of predetermined operation status of each of plurality of the LED displays.

In one embodiment, each of the plurality of optical light concentrator units further includes: (a) a light guiding block for collecting the light emitted by an LED displays, (b) an optical fiber having an input end and an output end, and (c) a concave lens for transmitting the light collected to the input end of the optical fiber. The light indicating operation status of the plurality of LED displays includes: (a) a blinking light, (b) a steady light, and (c) a plurality of colors, and the operation status of the plurality of LED displays is indicated by the color of the light and whether the light is blinking or steady.

In one embodiment, the optical fiber includes: (a) a plastic optical fiber, and (b) a quartz optical fiber.

In one embodiment, each of the plurality of LED Display Monitors includes a light color identifier. The light color identifier has an output end and an input end. The input end of the light color identifier is optically coupled to the output end of the optical fiber, and the output end of the light color identifier is coupled to the input end of the computer system via the communication link between the LED Display Monitors and the computer system. The communication link includes: (a) a wired communication link, (b) a wireless communication link, and (c) an optical communication link. The light color identifier also includes a light spectrum analyzer for analyzing the light spectrum and determine the color of the light and whether the light is blinking or steady. The computer system compares the operation status indicated by the plurality of the LED displays with the corresponding predetermined operation status stored in the computer system to determine whether an abnormality exists. If an abnormality exists, an alert is provided. The alerts can be audio alerts, visual alerts and electronic messaging alerts.

In yet another aspect, the present invention relates to a computer-readable medium storing instructions. When these instructions are executed by a computer system, these instructions cause the computer to perform a method for monitoring a plurality of LED displays on a plurality of electronic equipments using optical fiber as light transmission medium.

In one embodiment, the method includes following steps: (a) storing a plurality of predetermined operation status in a computer system for each of the plurality of LED displays, (b) providing a plurality of optical light concentrator units for collecting the light emitted by each corresponding LED display, (c) analyzing the light spectrum of the light collected for determining operation status indicated by the plurality of the LED displays by a plurality of LED Display Monitors, (d) comparing the operation status indicated by the plurality of the LED displays with a corresponding predetermined operation status stored in the computer system to determine whether an abnormality exists, and (e) providing alert if the abnormality exists.

In one embodiment, the computer system has: (1) an input end, (2) an output end, and (3) storage for storing a predetermined operation status of the plurality of LED displays. Each of the plurality of optical light concentrator units is adapted for each of the plurality of the LED displays for collecting the light emitted by corresponding LED display. The alerts include: audio alerts, visual alerts and electronic messaging alerts.

In one embodiment, the operation status for each of the plurality of LED displays is indicated by the light color of the LED display, and whether the light of the LED displays is blinking or steady.

In one embodiment, each of the plurality of optical light concentrator units further includes: (a) a light guiding block for collecting the light emitted by an LED display, (b) an optical fiber having an optical input end and an optical output end, and (c) a concave lens for transmitting the light collected to the input end of the optical fiber. The optical fiber includes (a) plastic optical fiber, and (b) quartz optical fiber.

In one embodiment, each of the plurality of LED Display Monitors includes: (a) a plurality of optical inputs optically coupled to the optical output ends of the optical fiber of the plurality of the optical light concentrator units, (b) an electronic output adapted for transmitting the operation status of each of the plurality of the LED displays coupled to the LED Display Monitor to the computer system via a communication link, and (c) a light color identifier. The communication link includes wired communication link, wireless communication link, and optical communication link. The light color identifier has (a) an output end, (b) an input end, and (c) a light spectrum analyzer. The input end of the light color identifier is optically coupled to the output end of the optical fiber, and the output end of the light color identifier is electronically coupled to the input end of the computer system via the communication link. The light spectrum analyzer is adapted for analyzing the light spectrum and determine the color of the light and whether the light is blinking or steady.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The drawings do not limit the present invention to the specific embodiments disclosed and described herein. The drawings are not necessarily to scale, emphasis instead being placed upon clearly illustrating the principles of the invention.

DETAILED DESCRIPTION OF THE INVENTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

Figure 1:
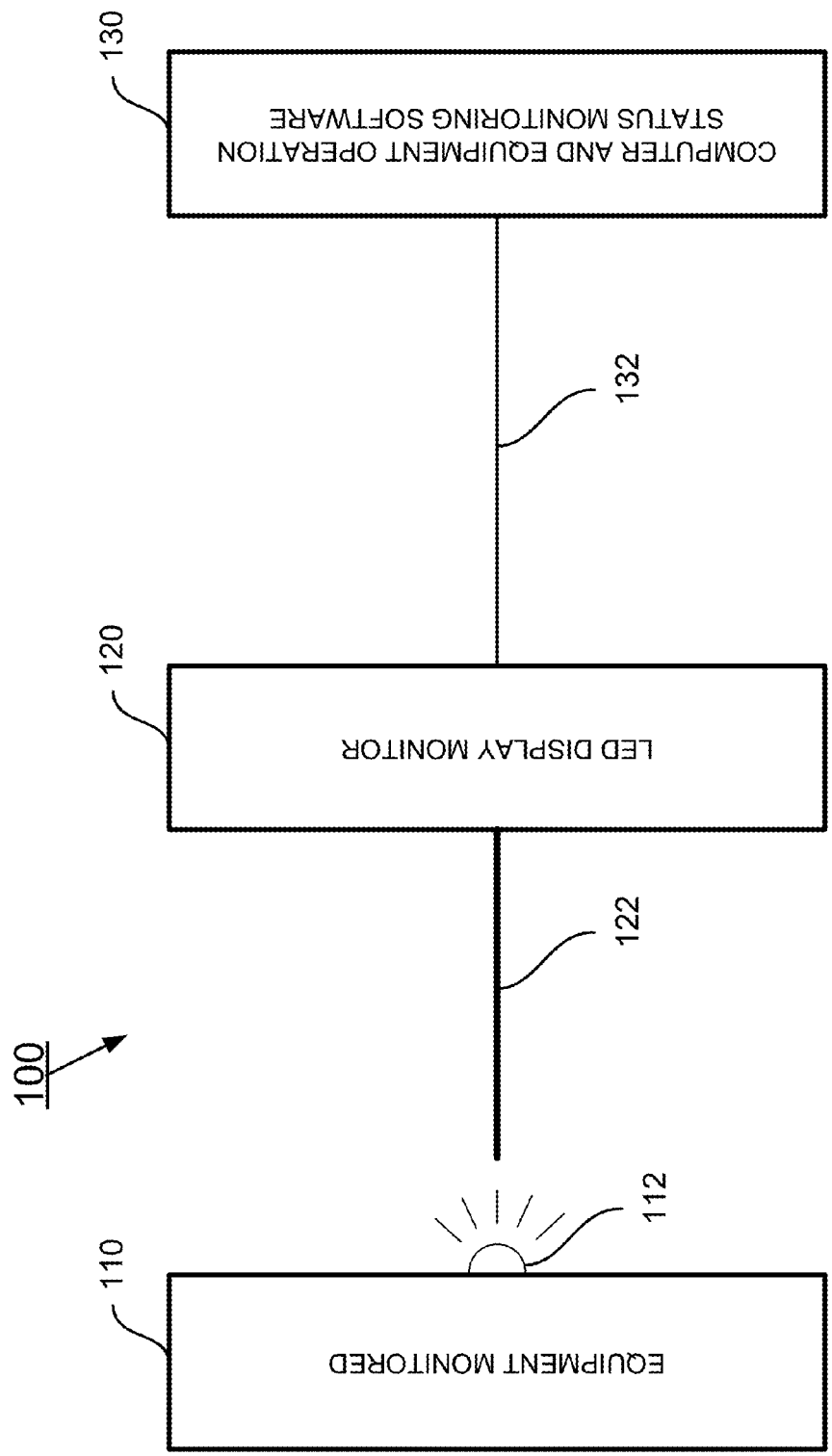
FIG. 1 is a flow chart showing a method of monitoring LED display using optical fiber as light transmission medium according to one embodiment of the present invention.

The description will be made as to the embodiments of the present invention in conjunction with the accompanying drawings in FIGS. 1-3.

In accordance with the purposes of this invention, as embodied and broadly described herein, this invention, in one aspect, relates to a method for monitoring LED display using optical fiber as light transmission medium. In one embodiment, the method as shown in FIG. 1 includes following steps: (a) storing a plurality of predetermined operation status in a computer system for each of the plurality of LED displays 112, (b) providing a plurality of optical light concentrator units 122, and each of the plurality of optical light concentrator units 122 adapted for each of the plurality of the LED displays 112 for collecting the light emitted by corresponding LED display 112, (c) analyzing the light spectrum of the light collected for determining the operation status indicated by the plurality of the LED displays 112 by a plurality of LED Display Monitors 120, (d) comparing the operation status indicated by the plurality of the LED displays 112 with a corresponding predetermined operation status stored in the computer system to determine whether an abnormality exists, and (e) providing alert if the abnormality exists.

In one embodiment, the computer system has an input end, and an output end, and a storage for storing the plurality of predetermined operation status. When an abnormality occurs, the computer system provides alerts. The alerts can be audio alerts, visual alerts, and electronic messaging alerts.

In one embodiment, the operation status for each of the plurality of LED displays 112 is indicated by the light color of the LED display 112, and whether the light of the LED displays 112 is blinking or steady. As shown in FIG. 3, each of the plurality of optical light concentrator units 122 further includes: (a) a light guiding block 1222 for collecting the light emitted by an LED display 112, (b) an optical fiber 1226 having an optical input end and an optical output end, and (c) a concave lens 1224 for transmitting the light collected to the input end of the optical fiber 1226. The optical fiber 1226 can be: (a) a plastic optical fiber, and (b) a quartz optical fiber.

In one embodiment, each of the plurality of LED Display Monitors 120 includes: (a) a plurality of optical inputs optically coupled to the optical output ends of the optical fiber 1226 of the plurality of the optical light concentrator units 122, (b) an electronic output adapted for transmitting the operation status of each of the plurality of the LED displays 112 coupled to the LED Display Monitor 120 to the computer system via a communication link 132, and (c) a light color identifier having an output end and an input end.

In one embodiment, the light color identifier also includes a light spectrum analyzer for analyzing the light spectrum and determine the color of the light and whether the light is blinking or steady. The input end of the light color identifier is optically coupled to the output end of the optical fiber 1226, and the output end of the light color identifier is electronically coupled to the input end of the computer system via the communication link between the plurality of the LED Display Monitors 120. The communication link 132 between the plurality of the LED Display Monitors 120 and the computer system includes (a) a wired communication link, (b) a wireless communication link, and (c) an optical communication link.

Figure 2:
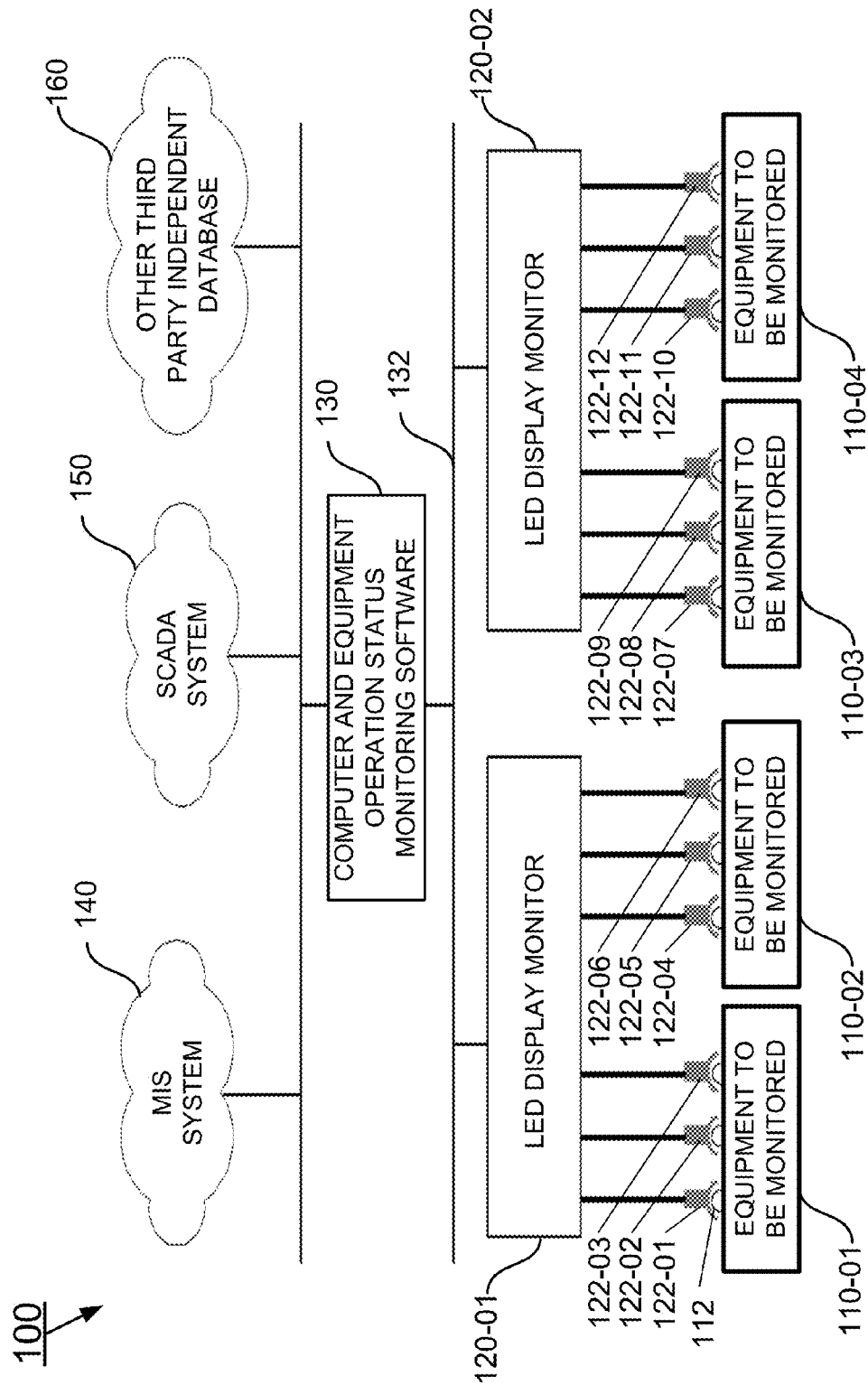
FIG. 2 is a block diagram for a device for monitoring LED display using optical fiber as light transmission medium according to one embodiment of the present invention.
Figure 3:
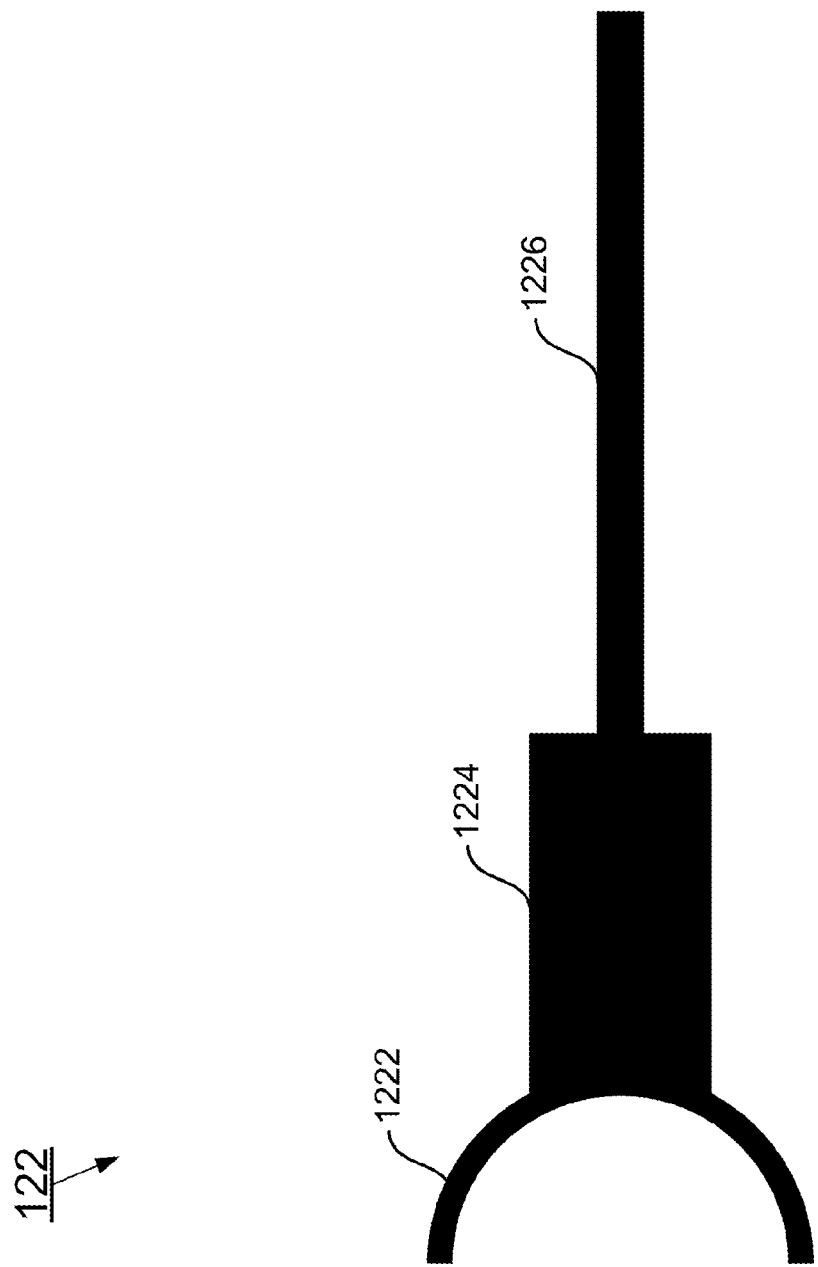
FIG. 3 is an optical light concentrator unit diagram showing detailed components according to one embodiment of the present invention.

Referring now to FIG. 2, a block diagram for a system 100 for monitoring LED display using optical fiber as light transmission medium is shown according to one embodiment of the present invention. In one embodiment, the system 100 includes: (a) a plurality of LED displays 112 on the plurality of electronic equipments to be monitored 110, (b) a plurality of optical light concentrator unit 122-01, 122-02, . . . and 122-12, (c) a plurality of LED Display Monitors 120-01, and 120-02, (d) an equipment LED display monitoring software 130 installed and executed in a computer system, and (e) a communication link 132 between the LED Display Monitors 120 and the computer system.

In one embodiment, the plurality of the LED displays 112 emit light indicating operation status of the plurality of electronic equipments to be monitored 110. Each of the optical light concentrator unit 122 collects the light emitted by each of corresponding LED displays 112. The LED Display Monitors 120-01 and 120-02 are optically coupled to the plurality of optical light concentrator units 122-01, 122-02, . . . and 122-12 for determining the operation status of the plurality of LED displays 112. The computer system has an input end, an output end, and a storage space for storing a plurality of predetermined operation status of each of plurality of the LED displays 112.

In one embodiment, each of the plurality of optical light concentrator units 122-01, 122-02, . . . , and 122-12 has: (a) a light guiding block 1222 for collecting the light emitted by an LED displays 112, (b) an optical fiber 1226 having an input end and an output end, and (c) a concave lens 1224 for transmitting the light collected to the input end of the optical fiber 1226.

In one embodiment, the optical fiber 1226 can be (a) a plastic optical fiber, and/or (b) a quartz optical fiber. If the quartz optical fiber is used, a light guiding block 1222 and concave lens 1224 will be used in the optical light concentrator unit since the quartz optical fiber is usually very thin. On the other hand, an exemplary plastic optical fiber with internal diameter 1.0 mm, and external diameter 2.2 mm can be used in the optical light concentrator units.

In one embodiment, the light indicating operation status of the plurality of LED displays 112 includes: (a) a blinking light, (b) a steady light, and (c) a plurality of colors. The operation status of each of the plurality of LED displays 112 is indicated by the color of the light and whether the light is blinking or steady.

In one embodiment, each of the plurality of LED Display Monitors 120-01 and 120-02 has a light color identifier. The light color identifier has an output end and an input end. The input end of the light color identifier is optically coupled to the output end of the optical fiber 1226, and the output end of the light color identifier is coupled to the input end of the computer system via the communication link 132. The light color identifier also has a light spectrum analyzer for analyzing the light spectrum and determine the color of the light and whether the light is blinking or steady. The light color identifier includes (a) light color sensor for converting the light sensed from the input into electronic signal, and a signal processor for receiving the electronic signal from the light sensor the reflect the operation status of the LED display, and for determining the current color of the LED display and whether the LED is steady or blinking.

In one embodiment, the system 100 for monitoring LED display using optical fiber as light transmission medium can be used to monitor many LED displays 112. The lights emitted by the LED displays 112 are collected by LED Display Monitors 120-01 and 120-02, by using optical light concentrator units 122-01, 122-02, . . . , and 122-12. The lights collected are transmitted to light color identifier of the LED Display Monitors for processing. The light color identifier of the LED Display Monitors filters the incoming light by using Red (R), Green (G) and Blue (B) color filters, and convert the light signal to RGB electronic signal. In the meantime, the duty cycle of the RGB electronic signal is processed to determine whether the light is blinking or steady. Based on the color, and whether the light is blink or steady, the LED Display Monitors determines the operation status of the particular LED display 112. The operation status of the LED display 112 is then transmitted to the computer system via a communication link. The computer system then compares the operation status of the LED display to its corresponding operation status stored in the computer system. The result of the comparison is reported to the operator via an audio alert, a visual alert and/or an electronic messaging alert, and recorded in the computer system, or transmitted to an MIS system 140, SCADA system 150, and other third party independent database 160. If an abnormality exists, an alert is provided by the computer to operators of the equipments or other external systems such as an MIS system 140, an SCADA system 150, and other third party independent database 160 as shown in FIG. 2.

In one embodiment, the communication link between the LED Display Monitors 120 and the computer system includes: (a) a wired communication link, (b) a wireless communication link, and (c) an optical communication link.

In another aspect, the present invention relates to a computer-readable medium storing instructions. When these instructions are executed by a computer system, these instructions cause the computer to perform a method for monitoring a plurality of LED displays 112 on a plurality of electronic equipments 110 using optical fiber as light transmission medium. In one embodiment, the method as shown in FIG. 1 includes following steps: (a) storing a plurality of predetermined operation status in a computer system for each of the plurality of LED displays 112, (b) providing a plurality of optical light concentrator units 122, and each of the plurality of optical light concentrator units 122 adapted for each of the plurality of the LED displays 112 for collecting the light emitted by corresponding LED display 112, (c) analyzing the light spectrum of the light collected for determining operation status indicated by the plurality of the LED displays 112 by a plurality of LED Display Monitors 120, (d) comparing the operation status indicated by the plurality of the LED displays 112 with a corresponding predetermined operation status stored in the computer system to determine whether an abnormality exists, and (e) providing alert if the abnormality exists.

In one embodiment, the computer system has an input end, and an output end, and a storage for storing the plurality of predetermined operation status. When an abnormality occurs, the computer system provides alerts. The alerts can be audio alerts, visual alerts, and electronic messaging alerts.

In one embodiment, the operation status for each of the plurality of LED displays 112 is indicated by the light color of the LED display 112, and whether the light of the LED displays 112 is blinking or steady. As shown in FIG. 3, each of the plurality of optical light concentrator units 122 further includes: (a) a light guiding block 1222 for collecting the light emitted by an LED display 112, (b) an optical fiber 1226 having an optical input end and an optical output end, and (c) a concave lens 1224 for transmitting the light collected to the input end of the optical fiber 1226. The optical fiber 1226 can be: (a) a plastic optical fiber, and (b) a quartz optical fiber.

In one embodiment, each of the plurality of LED Display Monitors 120 includes: (a) a plurality of optical inputs optically coupled to the optical output ends of the optical fiber 1226 of the plurality of the optical light concentrator units 122, (b) an electronic output adapted for transmitting the operation status of each of the plurality of the LED displays 112 coupled to the LED Display Monitor 120 to the computer system via a communication link 132, and (c) a light color identifier having an output end and an input end.

In one embodiment, the light color identifier also includes a light spectrum analyzer for analyzing the light spectrum and determine the color of the light and whether the light is blinking or steady. The input end of the light color identifier is optically coupled to the output end of the optical fiber 1226, and the output end of the light color identifier is electronically coupled to the input end of the computer system via the communication link between the plurality of the LED Display Monitors 120. The communication link 132 between the plurality of the LED Display Monitors 120 and the computer system includes (a) a wired communication link, (b) a wireless communication link, and (c) an optical communication link.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for monitoring a plurality of LED displays on a plurality of electronic equipments using optical fiber as light transmission medium comprising the steps of:
    (a) storing a plurality of predetermined operation status in a computer system for each of the plurality of LED displays, wherein the computer system comprises an input end and an output end;

(b) providing a plurality of optical light concentrator units, wherein each of the plurality of optical light concentrator units is adapted for each of the plurality of the LED displays for collecting the light emitted by corresponding LED display;

(c) analyzing the light spectrum of the light collected for determining operation status indicated by the plurality of the LED displays by a plurality of LED Display Monitors;

(d) comparing the operation status indicated by the plurality of the LED displays with a corresponding predetermined operation status stored in the computer system to determine whether an abnormality exists; and (e) providing alert if the abnormality exists, wherein the alerts comprise: an audio alert, a visual alert and an electronic messaging alert, wherein each of the plurality of LED Display Monitors comprises (i) a plurality of optical inputs optically coupled to the optical output ends of the optical fiber of the plurality of the optical light concentrator units;

(ii) an electronic output adapted for transmitting the operation status of each of the plurality of the LED displayed coupled to the LED Display Monitor to the computer system via a communication link, wherein the communication link comprises wired communication link, wireless communication link, and optical communication link; and (iii) a light color identifier having an output end and an input end, wherein the input end of the light color identifier is optically coupled to the output end of the optical fiber, and the output end of the light color identifier is electronically coupled to the input end of the computer system.

2. The method according to claim 1, wherein the operation status for each of the plurality of LED displays is indicated by the light color of the LED display, and whether the light of the LED displays is blinking or steady.

3. The method according to claim 2, wherein each of the plurality of optical light concentrator units further comprises:
(a) a light guiding block for collecting the light emitted by an LED display;
(b) an optical fiber having an optical input end and an optical output end; and
(c) a concave lens for transmitting the light collected to the input end of the optical fiber.

4. The method according to claim 3, wherein the optical fiber comprises:
(a) a plastic optical fiber; and
(b) a quartz optical fiber.

5. The method according to claim 1, wherein the light color identifier comprises a light spectrum analyzer for analyzing the light spectrum and determine the color of the light and whether the light is blinking or steady.

6. A system for monitoring LED displays on a plurality of electronic equipments to be monitored using optical fiber as light transmission medium comprising:
(a) a plurality of LED displays on the plurality of electronic equipments to be monitored, wherein the plurality of the LED displays emit light indicating operation status of the plurality of electronic equipments to be monitored;
(b) a plurality of optical light concentrator unit, wherein each of the optical light concentrator unit collects the light emitted by each of the plurality of LED displays;
(c) a plurality of LED Display Monitors optically coupled to the plurality of optical light concentrator units for determining the operation status of the plurality of LED displays, wherein each of the plurality of LED Display Monitors comprises
(i) a plurality of optical inputs optically coupled to the optical output ends of the optical fiber of the plurality of the optical light concentrator units;
(ii) an electronic output adapted for transmitting the operation status of each of the plurality of the LED displays coupled to the LED Display Monitor to the computer system via a communication link, wherein the communication link comprises wired communication link, wireless communication link, and optical communication link; and
(iii) a light color identifier having an output end and an input end, wherein the input end of the light color identifier is optically coupled to the output end of the optical fiber, and the output end of the light color identifier is electronically coupled to the input end of the computer system;

(d) an equipment LED display monitoring software installed and executed in a computer system having an input end and an output end, and storing a plurality of predetermined operation status of each of plurality of the LED displays; and (e) a communication link between the LED Display Monitors and the computer system.

7. The system according to claim 6, wherein each of the plurality of optical light concentrator units further comprises:
(a) a light guiding block for collecting the light emitted by an LED displays;
(b) an optical fiber having an input end and an output end; and
(c) a concave lens for transmitting the light collected to the input end of the optical fiber.

8. The system according to claim 7, wherein the light indicating operation status of the plurality of LED displays comprises:
(a) a blinking light;
(b) a steady light; and
(c) a plurality of colors,
wherein the operation status of each of the plurality of LED displays is indicated by the color of the light and whether the light is blinking or steady.

9. The system according to claim 8, wherein the optical fiber comprises:
(a) a plastic optical fiber; and
(b) a quartz optical fiber.

10. The system according to claim 9, wherein each of the plurality of LED Display Monitors comprises a light color identifier having an output end and an input end, wherein the input end of the light color identifier is optically coupled to the output end of the optical fiber, and the output end of the light color identifier is coupled to the input end of the computer system via the communication link.

11. The system according to claim 10, wherein the computer system compares the operation status indicated by the plurality of the LED displays with a corresponding predetermined operation status stored in the computer system to determine whether an abnormality exists; and provides alerts if the abnormality exists, wherein the alerts comprise audio alerts, visual alerts and electronic messaging alerts.

12. The system according to claim 11, wherein the light color identifier comprises a light spectrum analyzer for analyzing the light spectrum and determine the color of the light and whether the light is blinking or steady.

13. The system according to claim 12, wherein the communication link between the LED Display Monitors and the computer system comprises:
(a) a wired communication link;
(b) a wireless communication link; and
(c) an optical communication link.

14. The system according to claim 6, wherein the light color identifier comprises a light spectrum analyzer for analyzing the light spectrum and determine the color of the light and whether the light is blinking or steady.

15. A computer-readable medium storing instructions which, when executed by a computer system, cause the computer to perform a method for monitoring a plurality of LED displays on a plurality of electronic equipments using optical fiber as light transmission medium, the method comprising:
(a) storing a plurality of predetermined operation status in a computer system for each of the plurality of LED displays, wherein the computer system comprises an input end and an output end;
(b) providing a plurality of optical light concentrator units, wherein each of the plurality of optical light concentrator units is adapted for each of the plurality of the LED displays for collecting the light emitted by corresponding LED display;
(c) analyzing the light spectrum of the light collected for determining operation status indicated by the plurality of the LED displays by a plurality of LED Display Monitors;
(d) comparing the operation status indicated by the plurality of the LED displays with a corresponding predetermined operation status stored in the computer system to determine whether an abnormality exists; and
(e) providing alert if the abnormality exists, wherein the alerts comprise: an audio alert, a visual alert and an electronic messaging alert, wherein each of the plurality of LED Display Monitors comprises
  (i) a plurality of optical inputs optically coupled to the optical output ends of the optical fiber of the plurality of the optical light concentrator units;
  (ii) an electronic output adapted for transmitting the operation status of each of the plurality of the LED displays coupled to the LED Display Monitor to the computer system via a communication link, wherein the communication link comprises wired communication link, wireless communication link, and optical communication link; and
  (iii) a light color identifier having an output end and an input end, wherein the input end of the light color identifier is optically coupled to the output end of the optical fiber, and the output end of the light color identifier is electronically coupled to the input end of the computer system.

16. The computer-readable medium according to claim 15, wherein the operation status for each of the plurality of LED displays is indicated by the light color of the LED displays, and whether the light of the LED displays is blinking or steady.

17. The computer-readable medium according to claim 16, wherein the providing alert step further comprises:
(a) providing visual alert;
(b) providing audio alert; and
(c) providing electronic messages as alert.

18. The computer-readable medium according to claim 17, wherein each of the plurality of optical light concentrator units further comprises:
(a) a light guiding block for collecting the light emitted by each of the plurality of LED displays;
(b) an optical fiber having an input end and an output end; and
(c) a concave lens for transmitting the light collected to the input end of the optical fiber.

19. The computer-readable medium according to claim 18, wherein the optical fiber comprises:
(a) a plastic optical fiber; and
(b) a quartz optical fiber.

20. The computer-readable medium according to claim 15, wherein the light color identifier comprises a light spectrum analyzer for analyzing the light spectrum and determine the color of the light and whether the light is blinking or steady.

\* \* \* \* \*